United States Patent
Eberling

(10) Patent No.: US 6,322,159 B1
(45) Date of Patent: Nov. 27, 2001

(54) LATCHING ELECTRIC-CONTROL VEHICLE AIR BRAKE SYSTEM

(75) Inventor: Charles E. Eberling, Wellington, OH (US)

(73) Assignee: Honeywell Commercial Vehicle Systems Co., Elyria, OH (US)

( * ) Notice: Subject to any disclaimer, the term of this patent is extended or adjusted under 35 U.S.C. 154(b) by 0 days.

(21) Appl. No.: 09/667,368

(22) Filed: Sep. 22, 2000

(51) Int. Cl.[7] .............................. B60T 13/66; B60T 13/22
(52) U.S. Cl. ........................ 303/7; 303/15; 303/71; 303/3; 303/9.76; 188/1.11 R
(58) Field of Search ................... 303/7, 71, 9, 2–3, 303/9.76, 13–18; 188/170, 151 A, 1.11 R

(56) References Cited

U.S. PATENT DOCUMENTS

| | | | |
|---|---|---|---|
| 4,550,953 | * 11/1985 | Bartholomew | 303/71 |
| 4,671,578 | * 6/1987 | Rothen et al. | 303/15 |
| 4,763,959 | * 8/1988 | Vandemotter | 303/9 |
| 4,824,178 | * 4/1989 | Petersen | 303/15 |
| 5,061,015 | * 10/1991 | Cramer et al. | 303/7 |
| 5,118,165 | * 6/1992 | Latvala | 303/9.76 |
| 5,370,449 | * 12/1994 | Edelen et al. | 188/170 |
| 5,520,446 | * 5/1996 | Wilson | 303/9.76 |

\* cited by examiner

*Primary Examiner*—Douglas C. Butler

(57) ABSTRACT

An electric control valve for a heavy duty vehicle air parking brake system. The system uses latching electrically controlled solenoid air valves to control the parking brake systems of the tractor and trailer. The system allows electric control devices to be placed in the vehicle's instrument panel. The system maintains a previously set state of the system even in the event of a loss of electrical power to the controller. Indicator lamps provide park status information to the vehicle driver.

11 Claims, 2 Drawing Sheets

LATCHING ELECTRIC-CONTROL VEHICLE AIR BRAKE SYSTEM

TECHNOLOGY FIELD OF THE INVENTION

This invention generally relates to a brake controller for providing electrical control of a motor vehicle parking brake, and more particularly, the invention prevents inadvertent application of the parking brake in an air brake system when the vehicle loses electrical power.

BACKGROUND OF THE INVENTION

Conventional heavy-duty vehicle air brake systems use mechanical pneumatic push-pull control valves to actuate and release the vehicle parking brakes and the trailer brake supply line. According to Federal Motor Vehicle Safety Standard (FMVSS) No. 121, the parking brake and the trailer brake controls must be located in close proximity to the driver. This requires the installation of large pneumatic push-pull valves in the vehicle instrument panel and further requires pneumatic lines and connections within the instrument panel, connecting with other components of the truck air brake system. The resulting system is very bulky and uses critical volume in the instrument panel, often imposing design parameters to the detriment of driver comfort and convenience. Furthermore, installation of the instrument panel controls requires making complex airtight connections during final vehicle assembly. With the goal of improving instrument panel design and driver ergonomics, attempts have been made to reduce the volume of switches within the instrument panel. Fundamental limitations, however, limit the potential of this approach. A different approach to controlling application of the parking brake is the use of an electrical switch in the instrument panel, controlling a solenoid driven valve located remotely in the air parking brake system. An inherent disadvantage exists for previous electrically controlled systems. In an air brake system, the braking force is applied by a coil spring whenever the brake line pressure goes below a certain threshold level thus, when the brake line is at atmospheric pressure, the spring, activates the parking brake. In previous electrically controlled systems, when power was lost to the solenoid air valve, the valve would move to the exhaust position, dropping the parking brake line pressure to atmospheric and activating the parking brake. The result could be inadvertent engagement of the parking brake. In conducting a failure mode and effect analysis of such a failure due to a power loss, the combination of a single point failure having significant consequences discourages use of conventional electrical instrument panel controls for vehicle air brake systems of this type.

SUMMARY OF THE INVENTION

This invention provides for a latching electric control for a vehicle air parking brake system which is mounted to the instrument panel, overcoming the problems and disadvantages of the conventional techniques in the art. The invention provides for the use of a latching solenoid air valve that assures that a loss of electrical power on the highway will not result in an unwanted automatic application of the vehicle's parking brakes. Briefly, the invention includes tractor parking brake and trailer parking brake supply switches which control, through an electrical circuit, latching solenoid air valves which in turn control the air supply to the tractor parking brake and the trailer parking brake supply line. Additionally, low pressure switches automatically vent the parking brake and trailer supply lines under conditions of low supply pressure and indicate low pressure in the parking brake and trailer supply lines to instrument panel indicator lamps.

Further object features and advantages of the invention will become apparent from consideration of the following description and the appended claims when taken in connection with the accompanying drawings.

DETAILED DESCRIPTION OF THE PRIOR ART

Figure 1:
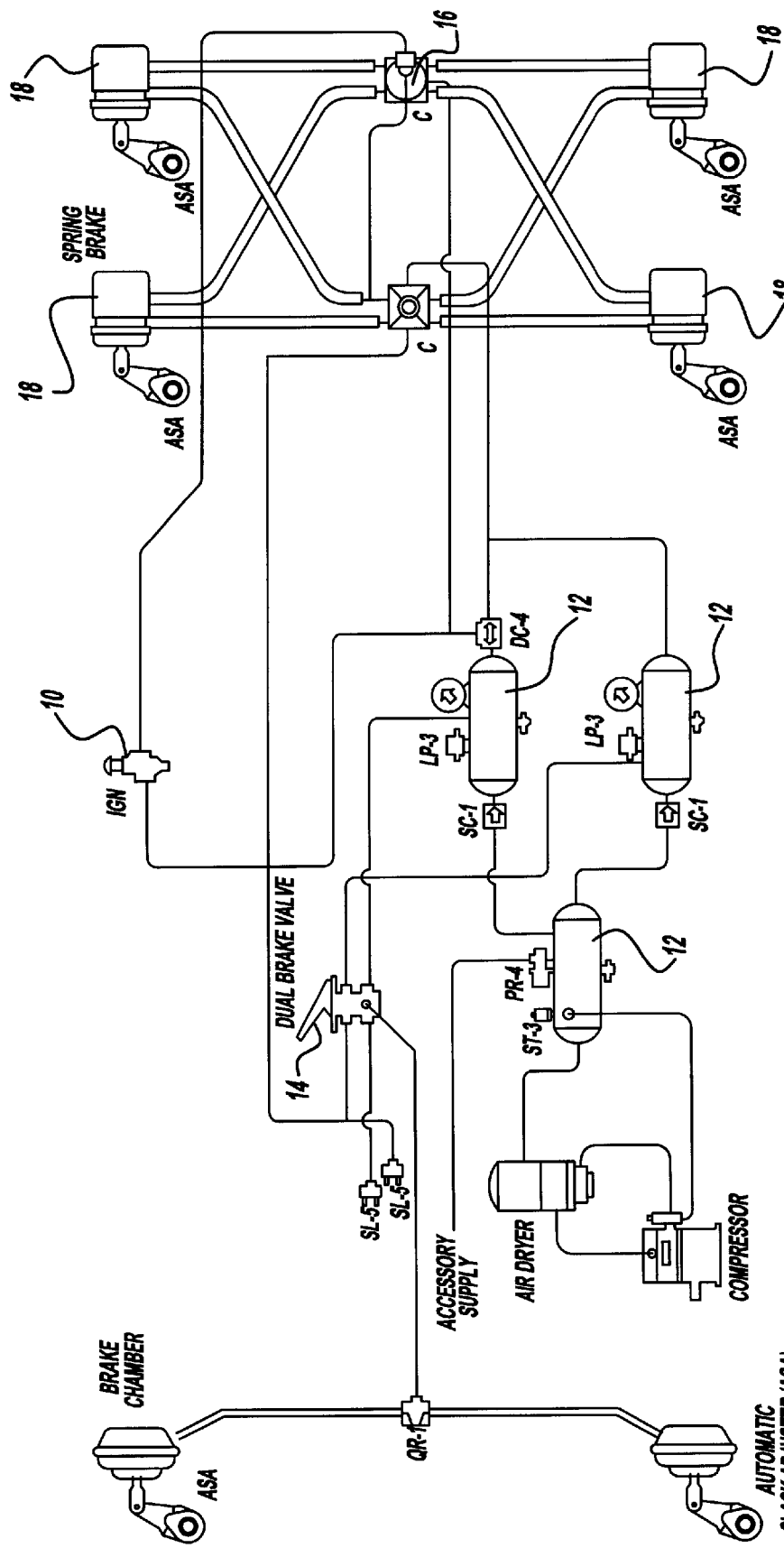
FIG. 1 is a schematic view of a conventional truck air brake system.

In order to understand the context of the present invention, it is desirable to briefly review a conventional truck air brake system with reference to FIG. 1. Control of the parking function is provided by a push-pull control valve 10 which is a mechanical, pneumatic valve capable of applying line pressure in a first position and exhausting the line pressure that is applying the parking brakes in a second position. Air pressure provided by a reservoir 12 flows through the valve 10 and through a spring brake relay valve 16 to release (deactivate) spring brakes 18 and allow normal movement of the vehicle. When the push-pull control valve 10 pin is activated, the line to spring brake 18 is vented to atmosphere and the spring brake activates the parking brake. Normal service braking is accomplished using a pedal mounted service brake valve 14 which, when activated, supplies air from both service reservoirs 12 to the front and rear service chambers of the brake portion of the spring brake actuator. Spring brake relay valve 16 will actuate the spring applied parking brakes if both service circuit reservoirs are failed.

DETAILED DESCRIPTION OF THE PREFERRED EMBODIMENT

The following description of the preferred embodiment is merely exemplary in nature, and is no way intended to limit the invention or its application or uses.

Figure 2:
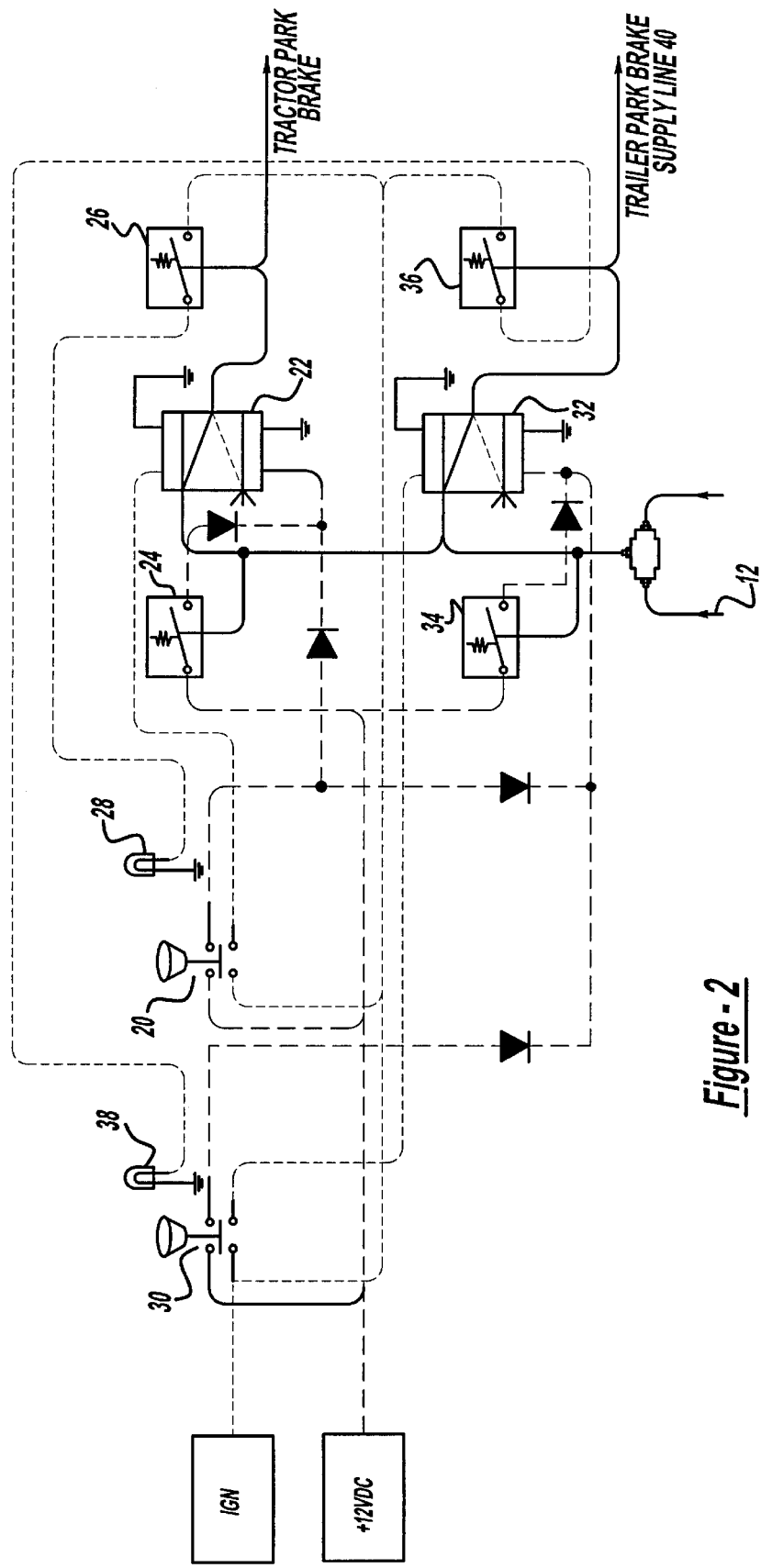
FIG. 2 is a schematic view of the present invention incorporated in a truck air brake system.

Shown in FIG. 2 is a schematic of the present invention showing an electro-pneumatic brake controller capable of controlling a parking brake and trailer supply line for the trailer parking brakes. In the figure, dashed lines represent electrical conductors whereas solid lines designate airflow lines. Starting with the electrical function of the parking brake portion of the circuit, a parking brake switch 20 of the double pole-double momentary contact throw type is provided on the instrument panel. The switch 20 is spring loaded to a normally center position, and can be depressed which provides a signal to a latching solenoid air valve 22, causing the valve to move to an open position. In the open position, air from the reservoir 12 can pass through the latching solenoid air valve 22 to the tractor parking brake and release the brake. When the parking brake switch 20 is pulled, a circuit is completed which moves the solenoid air valve 22 to an exhaust position. The line pressure to the parking brake then goes to atmospheric pressure and the tractor parking brake is applied. Low-pressure switch 24 automatically moves the latching solenoid air valve 22 to the exhaust position when the line pressure from the reservoir 12 goes below a preset limit. Additionally, a low pressure indicating switch 26 turns on a park brake indicator light 28 on the instrument panel of the vehicle when the line pressure to the park brake goes below the preset limit, indicating application of the parking brake.

Further shown in FIG. 2 is a schematic of the present invention showing an electro-pneumatic circuit capable of controlling the trailer parking brake supply line for the trailer brakes. Starting with the electrical function of the trailer parking brake supply line portion of the circuit, a trailer supply switch 30 is provided on the instrument panel. The switch 30 is a double pole-double throw momentary contact switch like switch 20, and is spring loaded to a normally off position. Switch 30 can be depressed which provides a signal to a latching solenoid air valve 32, causing the valve to move to an open position. In the open position, air from reservoir 12 can pass through the latching solenoid air valve 32 to a trailer parking brake supply line 40 and release the trailer brakes. When the trailer supply switch 30 is pulled, a circuit is completed which moves the solenoid air valve 32 to an exhaust position. The line pressure to the trailer parking brake supply line 40 then goes to atmospheric pressure and the trailer brakes are applied. A low-pressure switch 34 is provided which automatically moves the latching solenoid air valve 32 to the exhaust position when the line pressure from the reservoir 12 goes below a preset limit. Additionally a low pressure indicating switch 36 turns on a trailer supply indicator light 38 on the instrument panel of the vehicle when the line pressure to the trailer parking brakes goes below the preset limit, indicating application of the trailer parking brakes.

As required by FMVSS No. 121, an interlock is provided such that when the parking brake switch 20 is retracted and the parking brakes are applied, the trailer supply latching solenoid air valve 32 also moves to the exhaust position, applying the trailer parking brakes.

The special feature of the latching solenoid air valves 22 and 32 is that they are magnetically, spring or pneumatically latched to either of the respective open or exhaust positions, and can only change position upon application of the appropriate electrical signal to cause a change in state. Should power be lost, the latching solenoid air valves 22 and 32 will remain in the previous set states. Thus, a loss of electrical power will not cause an automatic application of the vehicle parking brakes. Latching solenoid air valves 22 and 32 are commercially available such as Parker Hannifin Skinner Model 7000 series latching solenoid air valves. FIG. 2 further shows a number of diodes in the electrical circuit. These devices provide circuit isolation required for proper system operation.

The foregoing discussion discloses and describes a preferred embodiment of the invention, one skilled in the art will readily be recognized from this discussion, and from the accompanying drawings and claims, that changes and modifications can be made to the invention without departing from the true spirit and fierce scope of the invention as defined in the following claims.

What is claimed is:

1. A parking brake controller for a vehicle equipped with air parking brakes for a tractor and a trailer, having a reservoir of air pressure and wherein said air parking brakes are deactivated upon application of air pressure to said air parking brakes, and activated upon a loss of air pressure to said air parking brakes, comprising:

a first solenoid air valve capable of being set in a first position for applying air pressure to said tractor air a first solenoid air valve capable of being set in a first position for applying air pressure to said tractor air parking brake, and capable of being set in a second position for venting said tractor air parking brake to atmosphere thereby activating said tractor air parking brake, said first solenoid air valve further including latching means that prevent the first solenoid air valve from moving out of an energized position due to a loss of electrical power;

a second solenoid air valve capable of being set in a first position for applying air pressure to said trailer air parking brake, and capable of being set in a second position for venting said trailer air parking brake to atmosphere thereby activating said trailer air parking brake, said second solenoid air valve further including latching means that prevent the second solenoid air valve from moving out of an energized position due to a loss of electrical power; and a control circuit controlled by at least one electrical switch capable of sending control signals to said first and second solenoid air valves for moving said solenoid air valves selectively between either of said first or second positions.

2. The parking brake controller for a vehicle according to claim 1 further comprising a first low air pressure switch capable of detecting a predetermined low air pressure within said reservoir and activating said first solenoid air valve to said exhaust position thereby activating said tractor air parking brake.

3. The parking brake controller for a vehicle according to claim 1 further comprising a first low-pressure indicator lamp capable of luminating said indicator when said air pressure applied to said tractor air parking brake is below a predetermined level.

4. The parking brake controller for a vehicle according to claim 1 further comprising a second low air pressure switch capable of detecting a predetermined low air pressure within said reservoir and activating said second solenoid air valve to said exhaust position thereby activating said trailer air parking brake.

5. The parking brake controller for a vehicle according to claim 1 further comprising a second low-pressure indicator lamp capable of luminating said indicator when said air pressure applied to said trailer air parking brake is below a predetermined level.

6. The parking brake controller for a vehicle according to claim 1 further comprising an interlock wherein said control circuit causes said first solenoid air valve to move to said second position and said second solenoid air valve to move to said second position.

7. The parking brake controller for a vehicle according to claim 1 wherein said control circuit further comprises a first double pole-double throw momentary contact for providing said control signals to cause said first solenoid air valve to move to said first position and to said second position.

8. The parking brake controller for a vehicle according to claim 7 wherein said control circuit further comprises a second double pole-double throw momentary contact switch for providing said control signals to cause said second solenoid air valve to move to said first position and to said second position.

9. A parking brake controller for a vehicle equipped with air parking brakes for a tractor and a trailer, having a reservoir of air pressure and where in said air parking brakes are deactivated upon application of air pressure to said air parking brakes, and activated upon a loss of air pressure to said air parking brakes, comprising:

a first solenoid air valve capable of being set in a first position for applying air pressure to said tractor air parking brake, and capable of being set in a second position for venting said tractor air parking brake to atmosphere thereby activating said tractor air parking brake, said first solenoid air valve further including latching means that prevent the first solenoid air valve from moving out of an energized position due to a loss of electrical power;

a second solenoid air valve capable of being set in a first position for applying air pressure to said trailer air parking brake, and capable of being set in a second position for venting said trailer air parking brake to atmosphere thereby activating said trailer air parking brake, said second solenoid air valve further including latching means that prevent the second solenoid air valve from moving out of an energized position due to a loss of electrical power;

a control circuit including a first electrical switch for providing control signals to said first solenoid air valve, causing said first solenoid air valve to move between said first and said second positions, and a second electrical switch for providing control signals to said second solenoid air value, causing said second solenoid air valve to move between said first and said second positions;

a first low-pressure indicator lamp capable of luminating said indicator when said air pressure applied to said tractor air parking brake is below a predetermined level;

a second low-pressure indicator lamp capable of luminating said indicator when said air pressure applied to said trailer air parking brake is below a predetermined level; and an interlock wherein said control circuit causes said first solenoid air valve to move to said second position and said second solenoid air valve to move to said second position.

10. The parking brake controller for a vehicle according to claim 9 wherein said first electrical switch is a double pole-double throw momentary contact switch for providing said control signals to cause said first solenoid air valve to move to said first position and to said second position.

11. The parking brake controller for a vehicle according to claim 9 wherein said second electrical switch is a double pole-double throw momentary contact switch for providing said control signals to cause said second solenoid air value to move to said first position and said second position.

* * * * *

UNITED STATES PATENT AND TRADEMARK OFFICE
CERTIFICATE OF CORRECTION

PATENT NO.   : 6,322,159 B1
DATED        : November 27, 2001
INVENTOR(S)  : Charles E. Eberling It is certified that error appears in the above-identified patent and that said Letters Patent is hereby corrected as shown below:

Column 3,
Lines 63-64, please delete "a first solenoid air valve capable of being set in a first position for applying air pressure to said tractor air".

Signed and Sealed this

First Day of July, 2003

JAMES E. ROGAN
*Director of the United States Patent and Trademark Office*